(12) United States Patent
Chen et al.

(10) Patent No.: US 9,235,246 B2
(45) Date of Patent: Jan. 12, 2016

(54) COMPUTING DEVICE AND POWER SUPPLY METHOD OF CONNECTION MODULE

(71) Applicants: Inventec (Pudong) Technology Corporation, Shanghai (CN); INVENTEC CORPORATION, Taipei (TW)

(72) Inventors: Chih-Ming Chen, Taipei (TW); Chian-Ting Chen, Taipei (TW); Wen-Tai Liu, Taipei (TW); I-Chan Wu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 392 days.

(21) Appl. No.: 13/844,886

(22) Filed: Mar. 16, 2013

(65) Prior Publication Data

US 2014/0115355 A1    Apr. 24, 2014

(30) Foreign Application Priority Data

Oct. 24, 2012    (CN) .......................... 2012 1 0411174

(51) Int. Cl.
*G06F 1/00* (2006.01)
*G06F 1/26* (2006.01)
*G06F 1/32* (2006.01)

(52) U.S. Cl.
CPC .............. *G06F 1/266* (2013.01); *G06F 1/3215* (2013.01); *G06F 1/3287* (2013.01); *G06F 1/3203* (2013.01); *Y02B 60/1282* (2013.01); *Y02B 60/32* (2013.01)

(58) Field of Classification Search
CPC ..... G06F 1/266; G06F 1/3215; G06F 1/3203; G06F 1/3287
See application file for complete search history.

(56) References Cited

U.S. PATENT DOCUMENTS 8,078,893 B2 * 12/2011 Umedu ......................... 713/320

* cited by examiner

*Primary Examiner* — Jaweed A Abbaszadeh
*Assistant Examiner* — Xuxing Chen
(74) *Attorney, Agent, or Firm* — Locke Lord LLP; Tim Tingkang Xia, Esq.

(57) ABSTRACT

The disclosure discloses a computing device including a connection module, a processing unit and a logic expansion unit, and a power supply method of a connection module. The connection module includes a detection unit and a power switch. The detection unit is configured to detect whether the connection module is connected with an external peripheral device, and to generate a detection signal. The power switch is configured to receive a power switching signal and to provide a rated voltage to the connection module according to the power switching signal. The processing unit and the logic expansion unit are coupled to each other. When the computing device is at a normal mode, the processing unit is configured to provide the power switching signal, acquires a connection status between the connection module and the external peripheral device, and to control the logic expansion unit to record the connection status.

6 Claims, 3 Drawing Sheets

COMPUTING DEVICE AND POWER SUPPLY METHOD OF CONNECTION MODULE

CROSS-REFERENCE TO RELATED APPLICATIONS

This non-provisional application claims priority under 35 U.S.C. §119(a) on Patent Application No(s). 201210411174.8 filed in China on Oct. 24, 2012, the entire contents of which are hereby incorporated by reference.

BACKGROUND OF THE INVENTION

1. Technical Field of the Invention

The disclosure relates to a computer application technique; in particular, to a computing device which detects the connection status of a connection module, in order to determine whether to provide electric power.

2. Description of the Related Art

When the computer system (for example, a desktop computer, a notebook computer, or an all-in-one computer) including universal serial bus (USB) connection ports enters a shutdown mode or a sleep mode, the chip sets (for example, a south bridge chip set) in the computer system still provide power (for example, a 5V voltage) to the USB connection ports, for sensing the input signals transmitted by the peripheral devices, such as a mouse, a keyboard, or some external human interface devices (HID). That is, the peripheral devices can receive a power supply from the computer system through the USB connection ports, no matter what mode the computer system is under. For example, when the computer system is in the shutdown mode or the sleep mode, the USB connection ports still continuously provide electric power to the HID devices such as the mouse and the keyboard, thus the user can turn on or make the computer system recover to the normal mode by triggering the mouse or pushing the specific button on the keyboard via the USB connection ports.

However, the disadvantage of the above manners is that the computer system needs to provide electric power to each of the USB connection ports no matter if the computer system is in the shutdown mode or the standby mode, thus the electric power is wasted. For example, when the computer system is in the sleep mode, each USB connection port still consumes 500 microamperes ($\mu A$, low power devices) or 2.5 milliamperes (mA, high power devices) of electric currents, that means respectively consuming 2500 $\mu W$ or 12.5 mW of the electric power. Moreover, the conventional computer system has a plurality of USB connection ports, which makes small power consumptions be accumulated into large power consumption. In addition, the computer system usually does not have the relating mechanisms for detecting whether each of the USB connection ports is connected to a corresponding human interface device (HID). That is, the computer system cannot know connection statuses of the USB connection ports, thus the south bridge chips can only provide electric power to all of the USB connection ports. Therefore, the unused USB connection ports of the computer system still consume unnecessary electric power.

SUMMARY OF THE INVENTION

The disclosure provides a computing device comprising a connection module, a processing unit and a logic expansion unit. The connection module comprises a detection unit and a power switch. The detection unit is configured to detect whether the connection module is connected with an external peripheral device, and to generate a detection signal. The power switch is configured to receive a power switching signal, and to providing a rated voltage to the connection module according to the power switching signal. The processing unit and the logic expansion unit are coupled to each other. When the computing device is at a normal mode, the processing unit is configured to provide the power switching signal, acquires a connection status between the connection module and the external peripheral device. The processing unit is configured to control the logic expansion unit to record the connection status. When the computing device is converted from the normal mode to a power saving mode, the logic expansion unit provides the power switching signal according to the connection status, such that the power switch stops providing electric power to the connection module which is not connected with the external peripheral device. The logic expansion unit continuously receives the electric power when the computing device is in the power saving mode.

In one embodiment of the disclosure, the above computing device further comprises: a microprocessor coupled to the processing unit and the logic expansion unit, the microprocessor is configured to receive the detection signal, and then to notify the processing unit and the logic expansion unit about the connection status between the connection module and the external peripheral device; wherein when the computing device is in the power saving mode and the connection status between the connection module and the external peripheral device is converted from "connecting" to "disconnected", the microprocessor is configured to adjust the connection status of the logic expansion unit, such that the power switch stop providing electric power to the connection module which is not connected with the external peripheral device, and wherein the microprocessor continuously receives electric power when the computing device is in the power saving mode.

In one embodiment of the disclosure, both the processing unit and the microprocessor communicate with and control the logic expansion unit through an inter-integrated circuit bus.

In one embodiment of the disclosure, the computing device further comprises: a switching unit coupled to the processing unit and the logic expansion unit and configured to switch the power switching signal provided by the processing unit and the logic expansion unit according to which mode, the normal mode or the power saving mode, the computing device is under.

In one embodiment of the disclosure, the logic expansion unit is a GPIO expander, the connection module is compliance with the standard of universal serial bus, and the power saving mode is a shutdown mode or a standby mode.

In another aspect of the disclosure, provided is a computing device which comprises a plurality of connection modules, a detection unit, a power switch, a processing unit and a logic expansion unit. Each of the plurality of connection modules comprises a detection unit and a power switch. The detection unit is configured to detect whether the connection module is connected with an external peripheral device correspondingly, and to correspondingly generate a detection signal. The power switch is configured to receive a power switching signal and to provide a rated voltage to the connection module according to the power switching signal. The processing unit and the logic expansion unit are coupled to each other. When the computing device is in a normal mode, the processing unit is configured to provide the corresponding power switching signal, acquires a connection status between the connection modules and the corresponding external peripheral devices according to the corresponding detection signals, and to control the logic expansion unit to record the connection statuses. When the computing device is converted from the normal mode to a power saving mode, the logic expansion unit is configured to provide the plurality of corresponding power switching signals according to the connection statuses, such that the plurality of corresponding power switches stop providing electric power to the plurality of connection modules which are not connected with the plurality of corresponding external peripheral devices. The logic expansion unit continuously receives electric power when the computing device is in the power saving mode.

In still another aspect of the disclosure, provided is a power supply method of a connection module which is applicable for a computing device including the connection module. The power supply method comprises the following steps. When the computing device is in a normal mode, a power switching signal is provided for applying a rated voltage to the connection module. Whether the connection module is connected with an external peripheral device is detected, such that a connection status between the connection module and the external peripheral device is acquired. The connection status is recorded in a logic expansion unit. When the computing device is converted from the normal mode to a power saving mode, the logic expansion unit provides the power switching signal according to the connection status such that the power switch stop providing electric power to the connection module not connected with the external peripheral device. The logic expansion unit continuously receives electric power when the computing device is in the power saving mode.

BRIEF DESCRIPTION OF THE DRAWINGS

The disclosure will become more fully understood from the detailed description given herein below for illustration only, thus does not limit the disclosure, wherein.

DETAILED DESCRIPTION

Figure 1:
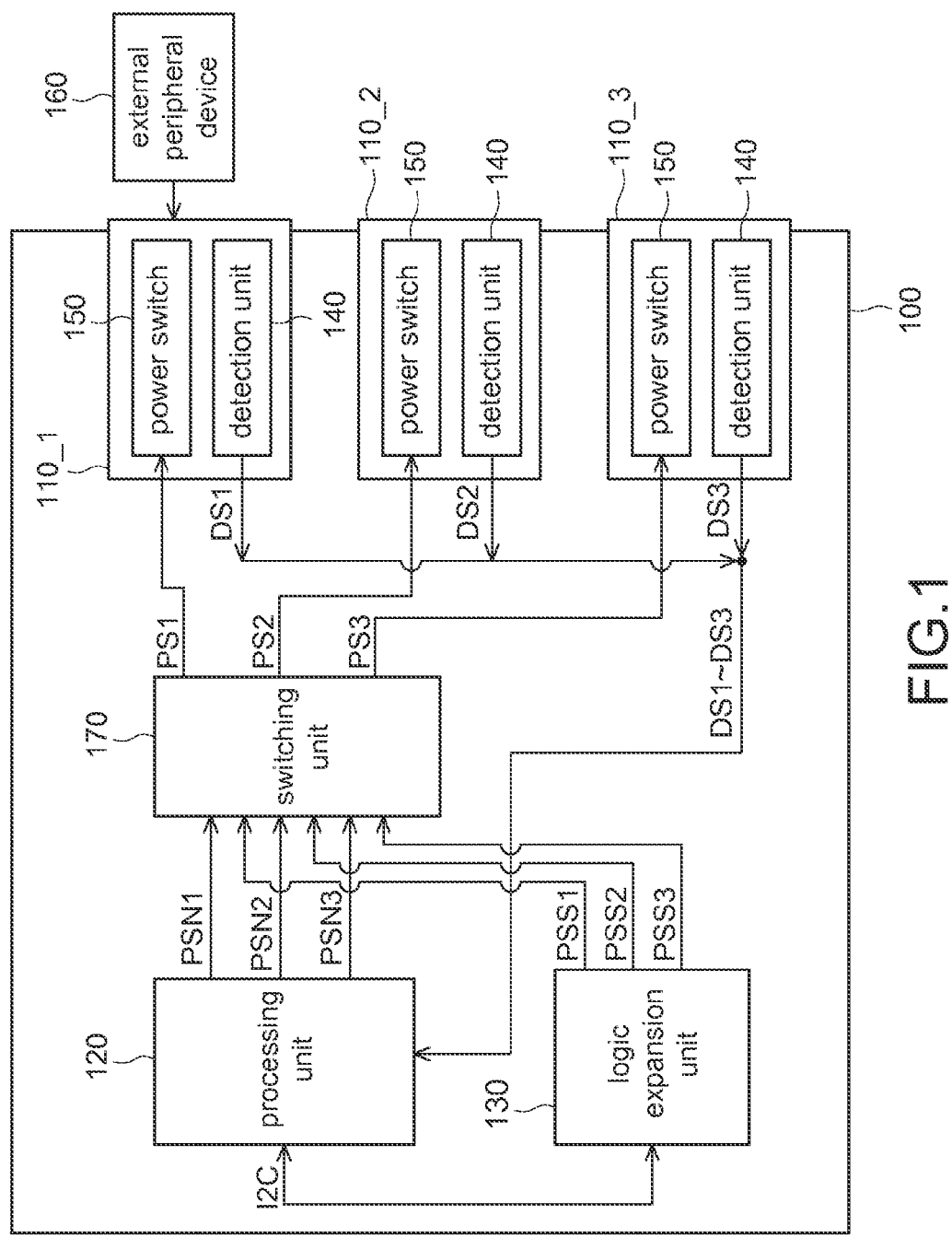
FIG. 1 is a block diagram of a computing device according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In order to make a computing device save more power and avoid extra electric power consumptions, the computing device, according to an embodiment of the disclosure, uses a logic expansion unit with lower power consumption under a power saving mode. A logic expansion unit controls the power source of each connection module according to a connection status between the connection module and an external peripheral device under a normal mode of the computing device, and stops providing electric power to the connection module which is not connected with relating devices, in order to save electric power. The following descriptions show the relating embodiments as reference.

FIG. 1 is a block diagram of a computing device 100 according to a first embodiment of the disclosure. The computing device 100 is, for example, a relating computer system including a connection port module, such as a desktop computer, a notebook computer, or an all-in-one computer, etc. The computing device 100 comprises a plurality of connection modules 110_1 to 110_3, a processing unit 120, and a logic expansion unit 130. In this embodiment, the computing device 100 usually comprises one or more connection modules, and the implementations thereof can be the universal serial bus (USB) connection ports 110_1 to 110_3. That is, the connection modules 110_1 to 110_3 are compliance with the standard of the USB. FIG. 1 in this disclosure only shows three USBs as the examples of the connection modules. However, the number of the connection modules can be correspondingly adjusted according to the actual requirements, and is not limited to the disclosure.

In this embodiment, each of the connection modules 110_1 to 110_3 comprises a detection unit 140 and a power switch 150. The detection unit 140 is configured to detect whether the corresponding connection modules 110_1 to 110_3 are connected with the external peripheral device 160 through corresponding male and female connectors, for generating detection signals DS1 to DS3. The implementation of the detection operation of the detection unit 140 by using physical connectors can include determining whether the specific pins of the connectors are floating or connected with a specific voltage, or the detection may be implemented by other manners, and is not described herein.

The power switch 150 of each of the connection modules 110_1 to 110_3 is configured to respectively receive corresponding power switching signals PS1 to PS3, and to provide a rated voltage (such as 5V) according to the power switching signals PS1 to PS3 to each of the connection modules 110_1 to 110_3, for providing electric power to the coupled external peripheral device 160. The power switch 150 in this embodiment is implemented, for example, by using a single transistor or relating circuits.

In addition, the computing device 100 further comprises a switching unit 170 which is coupled to the processing unit 120 and the logic expansion unit 130. According to which mode, the normal mode or the power saving mode, is the computing device 100 situated in, the switching unit 170 is configured to respectively switch three first power switching signals PSN1 to PSN3 provided by the processing unit 120 or three second power switching signals PSS1 to PSS3 provided by the logic expansion unit 130 to the power switching signals PS1 to PS3 which are transmitted to the connection modules 110_1 to 110_3. In this embodiment, the switching unit 170 is implemented, for example, by a plurality of OR gates.

Generally, when the computing device 100 is under normal mode or the power saving mode, such as shutdown mode or standby mode, the power switching signals PS1 to PS3 are usually activated (i.e., enabled), for continuously providing the electric power to the external peripheral device 160, which causes extra and unnecessary power consumptions. Because of the above-mentioned problem, the processing unit 120 according to the embodiment in the disclosure automatically turns off the connection modules 110_1 to 110_3 which are not connected with the external peripheral device 160 by using the logic expansion unit 130 with lower power consumption when the computing device 100 is under the power saving mode (such as the shutdown mode or the standby mode).

The following descriptions show each of the components according to an embodiment of the disclosure and the enabling manners thereof. The processing unit 120 is coupled to the logic expansion unit 130, and they communicate with each other by using, for example, an inter-integrated circuit ($I^2C$) bus for making the processing unit 120 control the logic expansion unit 130. The processing unit 120 is, for example, the central processing unit or the chip set which is based on the structure of X86 in the computer, or the central processing unit numbered "TERA2321" which is manufactured by the Advanced RISC Machines® (ARM®) company. The logic expansion unit 130 in this embodiment is implemented by, for example, a GPIO expander, such as a GPIO expander with the model number "PCA9534PW". The exemplary GPIO expander has only 660 microwatts (μW), which is much smaller than the 2500 μW or 12.5 milliwatts (mW) power of the USB connection port.

Therefore, when the computing device 100 is under the normal mode (i.e, the processing unit of the computing device 100 works normally), the processing unit 120 provides the power switching signals PSN1 to PSN3, and then the switching unit 170 transmits the power switching signals PSN1 to PSN3, which are taken as the power switching signals PS1 to PS3, to the corresponding connection modules 110_1 to 110_3. The processing unit 120 also acquires the connection statuses between the connection modules 110_1 to 110_3 and the external peripheral devices 160 according to the detection signals DS1 to DS3 detected by the detection unit 140. In addition, the processing unit 120 controls the logic expansion unit 130 through the I²C for recording the aforementioned connection statuses.

For example, when the computing device 100 is under the normal mode, the external peripheral device 160 (such as a USB keyboard or a USB mouse) has already been coupled to the first connection module 110_1 in FIG. 1, and the connection modules 110_2 and 110_3 are not connected with any corresponding external peripheral devices. Thus, the processing unit 120 then controls the logic expansion unit 130 through the inter-integrated circuit (I²C) bus for recording the connection statuses in the corresponding flag registers.

When the computing device 100 is converted from the normal mode to the power saving mode, due to the power saving mechanism, the processing unit 120, which occupies higher power consumption, stops working because the power supply stops. At that moment, the logic expansion unit 130 provides power switching signals PSS1 to PSS3 according to the connection statuses stored in the flag registers, and then the switching unit 170 transmits the power switching signals PSS1 to PSS3, which are taken as the power switching signals PS1 to PS3, to the corresponding connection modules 110_1 to 110_3. Therefore, the logic expansion unit 130 can make the power switches 150 in the connection modules which are not connected with the external peripheral device 160 (for example, the connection modules 110_2 and 110_3) stop providing electric power, to avoid wasting electric power. In this embodiment, the logic expansion unit 130 still receives the electric power provided by the computing device 100 when the computing device 100 is under the power saving mode, in order to implement the power saving mechanism in this embodiment.

It is worth noting that, because the logic expansion unit 130 only needs 660 μW of electric power for working when the computing device 100 is in the power saving mode, while each of the connection modules 110_1 to 110_3 (for example, the USB connection port module) needs 2500 μW or 12.5 mW of electric power. Thus, by using the above-mentioned mechanism, unless all of the connection modules 110_1 to 110_3 of the computing device 100 are connected with the corresponding peripheral devices 160 to consume greater electric power, the electric power consumptions still can be reduced.

In addition, if the user plugs the external peripheral device 160 into the connection modules 110_1 to 110_3 when the computing device is under the power saving mode, the present computing device 100 cannot determine the type of the external peripheral device 160 and drive it under the power saving mode. Thus, even if the computing device 100 provides electric power to the corresponding connection modules 110_1 to 110_3 at this moment, the plugged external peripheral device 160 still cannot work properly. Therefore, the present embodiment cannot determine whether there is an external peripheral device 160 being plugged into any of the connection modules 110_1 to 110_3 when the computing device 100 is under the power saving mode.

In the first embodiment, the connection statuses of the connection modules 110_1 to 110_3 are monitored or detected when the computing device 100 operates normally, in order to turn off the unused connection modules when the computing device 100 is under the power saving mode. However, if the user unplugs the external peripheral device when the computing device 100 is under the power saving mode, because in the logic expansion unit 130, the connection statuses between the connection modules 110_1 to 110_3 and the external peripheral device 160 cannot be adjusted under the power saving mode, the corresponding connection modules 110_1 to 110_3 in the first embodiment cannot stop providing electric power immediately, which consumes some extra electric power. Therefore, the disclosure provides a second embodiment for solving the above-mentioned problem.

Figure 2:
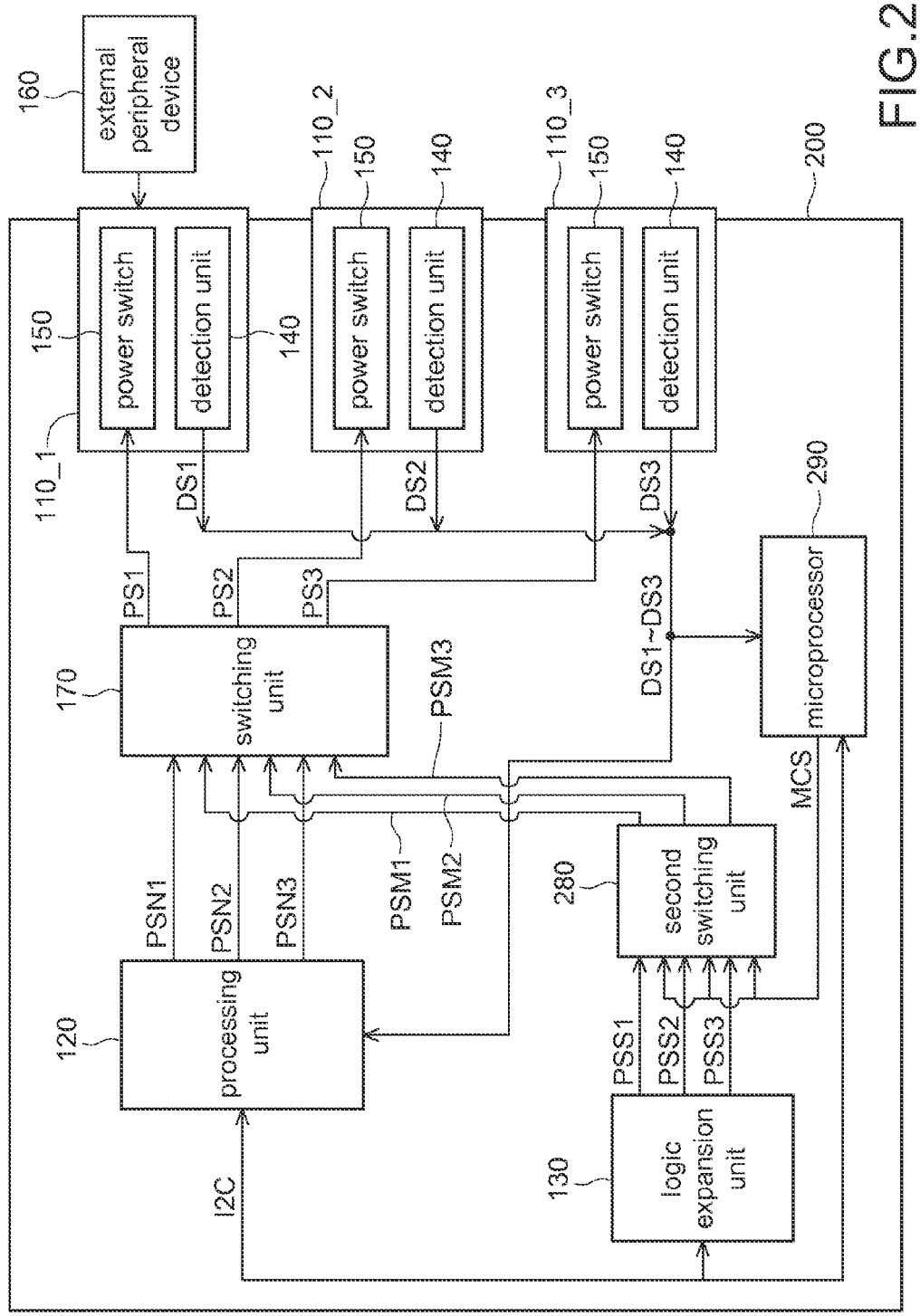
FIG. 2 is a block diagram of a computing device according to a second embodiment of the disclosure.

FIG. 2 is a block diagram of a computing device 200 according to the second embodiment of the disclosure. The second embodiment of the disclosure is similar to the first embodiment, and the differences between the two are that the computing device 200 further comprises a microprocessor 290 and a second switching unit 280. On the basis of the hardware structure of the computing device 200, the detection for detecting whether or not the connection modules 110_1 to 110_3 are connected with the external peripheral devices 160 is usually implemented by using the independent microprocessor 290 or an embedded chip. That is, the microprocessor 290 is coupled to the processing unit 120 and the logic expansion unit 130. The microprocessor 290 is configured to communicate with the processing unit 120 through an inter-integrated circuit (I²C), and to control the logic expansion unit 130 for assisting with adjusting the internal data of the logic expansion unit 130.

Thus, the microprocessor 290 in the second embodiment is configured to receive the detection signals DS1 to DS3, and then to notify the processing unit 120 and the logic expansion unit 130 of the connection statuses between the connection modules 110_1 to 110_3 and the external peripheral device 160.

In another embodiment, when under the normal mode, the processing unit 120 is also configured to receive the detection signals DS1 to DS3 for acquiring the connection statuses between the connection modules 110_1 to 110_3 and the external peripheral device 160. In addition, when the computing device 200 is converted from the normal mode to the power saving mode, the processing unit 120 then records the connection statuses into the flag registers of the logic expansion unit 130, similar to the first embodiment.

Moreover, when the computing device 200 is under the power saving mode, if the microprocessor 290 detects that the connection status between the connection module (for example, 110_1) and the external peripheral device 160 is converted from "connecting" to "disconnected", in other words, when the user unplugs the external peripheral device 160 from the computing device 200 as well as the computing device 200 is under the power saving mode, the microprocessor 290 then adjusts the connection status recorded in the logic expansion unit 130 by using the micro control signal (MCS) cooperating with the second switching unit 280, or using the inter-integrated circuit (I²C) bus, in order to make the power switch 150, of the connection module 110_1, stop providing electric power to the connection module 110_1 which is not connected with the external peripheral device 160.

When the microprocessor 290 uses the inter-integrated circuit (I²C) for adjusting the flag registers of the logic expansion unit 130, the power switching signals PSS1 to PSS3 are directly used, and the signal adjustment can be executed without the assistance of the second switching unit 280. In another aspect, the microprocessor 290, according to the embodiment of the disclosure, uses the micro control signal (MCS) and the hardware structure in the second switching unit 280 to adjust the power switching signals PSS1 to PSS3 into the power switching signals PSM1 to PSM3, for example, the second switching unit 280 can be implemented by a plurality of AND gates. Therefore, at this moment, the first switching unit 170 uses the adjusted power switching signals PSM1 to PSM3 as the power switching signals PS1 to PS3, and transmits them to the corresponding connection modules 110_1 to 110_3. Thus, the microprocessor 290 in the second embodiment will receive the electric power continuously when the computing device 200 is under the power saving mode.

Figure 3:
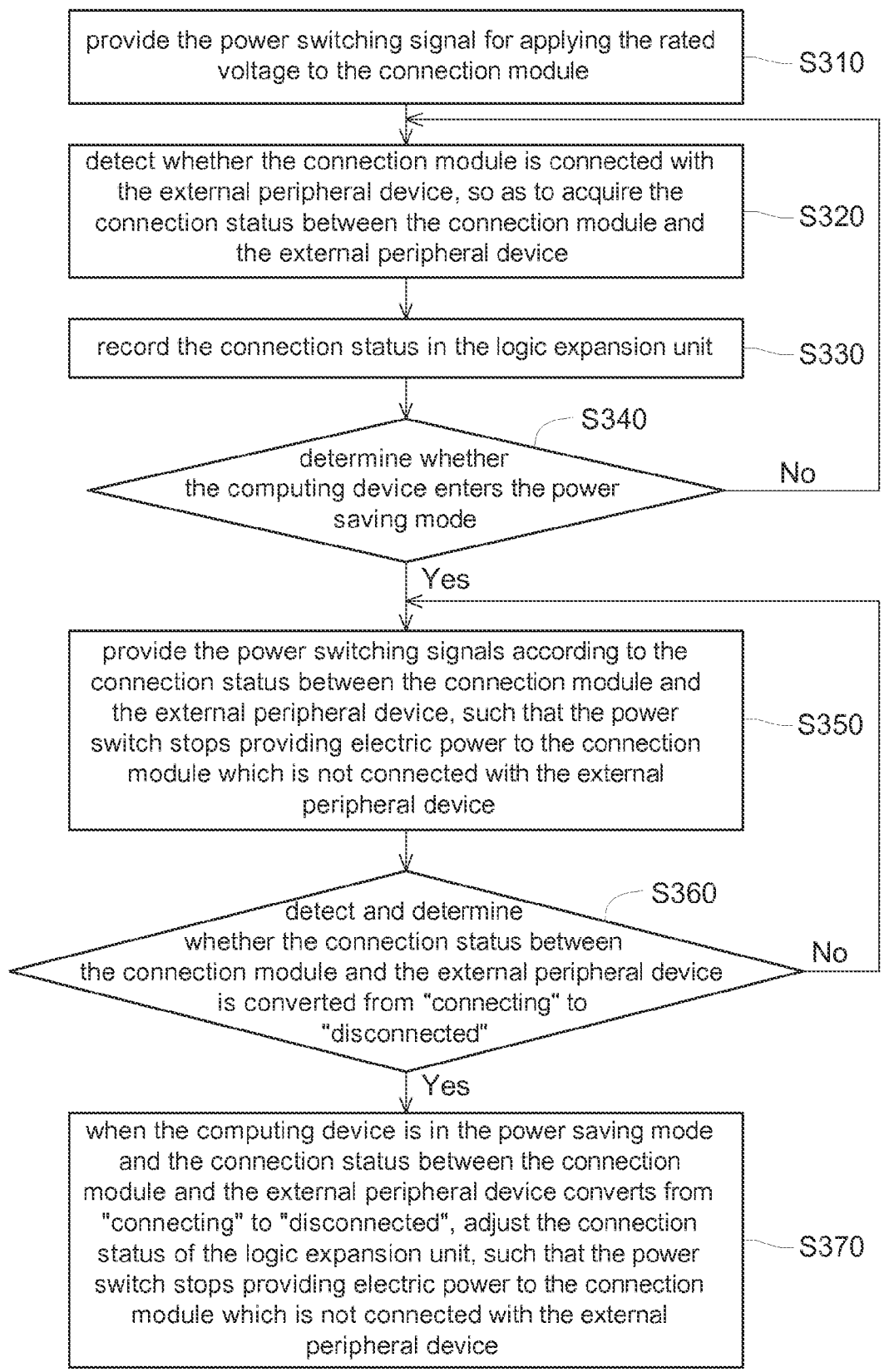
FIG. 3 is a flow chart of a power supply method of a connection module according to an embodiment of the disclosure.

The above embodiments are concluded as a power supply method of the connection module, wherein the method is suitable for the first and second embodiments. FIG. 3 shows a flow chart of a power supply method of a connection module according to an embodiment of the disclosure. The hardware structures in FIG. 2 are used herein for explanations. Please refer to FIG. 3 along with FIG. 2, step S310 includes that when the computing device 200 is under the normal mode, the processing unit 120 provides the power switching signals PSN1 to PSN3 such that the power switches 150 apply the rated voltages to the corresponding connection modules 110_1 to 110_3. Step S320 includes that the processing unit 120 detects whether the connection modules 110_1 to 110_3 are connected with the external peripheral device 160, such that the connection statuses between the connection modules 110_1 to 110_3 and the external peripheral device 160 is acquired.

Step S330 includes that the processing unit 120 records the connection statuses between the connection modules 110_1 to 110_3 and the external peripheral device 160 into the logic expansion unit 130. Step S340 includes that the processing unit 120 determines whether the computing device 200 is entering the power saving mode (such as a shutdown mode or a standby mode). When the computing device 200 is not entering the power saving mode, the method then goes back to the steps S320 to S330 for continuously updating the connection statuses in the logic expansion unit 130, or for updating the connection statuses in the logic expansion unit 130 a time period before the computing device 200 is converted into the power saving mode.

In step 340, when the computing device 200 is entering the power saving mode, that is, when the computing device 200 is converted from the normal mode to the power saving mode, step S350 includes that the logic expansion unit 130 provides the power switching signals PSS1 to PSS3 according to the connection statuses between the connection modules 110_1 to 110_3 and the external peripheral device 160, such that the corresponding power switches 150 stop providing electric power to the connection modules 110_1 to 110_3 which are not connected with the external peripheral device 160. The logic expansion unit 130 continuously receives electric power when the computing device 200 is under the power saving mode.

Step S360 includes that when the computing device 200 is under the power saving mode, the microprocessor 290 detects and determines whether the connection statuses between the connection modules and the external peripheral device 160 are converted from "connecting" to "disconnected". When the connection statuses are not changing from "connecting" to "disconnected", the method then goes back to step S350 and continuously executes step S360, unless that the computing device 200 is changing back to the normal mode, the method goes back to the step S310.

When the microprocessor 290 detects that the connection status between one of the connection modules (for example, 110_1) and the external peripheral device 160 is changing from "connecting" to "disconnected", the method then goes from step S360 to step S370, and the microprocessor 290 then adjusts the connection status recorded in the logic expansion unit 130, or adjusts the power switching signals PSS1 to PSS3 into the power switching signals PSM1 to PSM3 by using the second switching unit 280 and the micro control signal MCS, such that the corresponding power switch 150 stops providing the electric power to the connection module (for example, the connection module 110_1) which is not connected with the external peripheral device 160. The rest of the relating explanations not shown in this embodiment can be referred to in the descriptions of the above first and second embodiments, and are not repeatedly described herein.

On the basis of the above, the computing device and the power supply method of the connection module, according to the embodiments of the disclosure, the connection statuses of each of the connection modules under the normal mode are detected and recorded, that is, whether each of the connection modules is connected with the external peripheral device or not are detected. When the computing device enters the shutdown mode or the standby mode, the processing unit (for example, the central processing unit or the chip set) which initially controls the connection modules will stop working Thus, the embodiments use the logic expansion unit which continuously receives electric power in the computing device for providing electric power to the connection modules connected with the external peripheral device according to the recorded connection statuses, and to stop providing electric power to the unused connection modules. Because the power consumptions of the logic expansion unit, when the computing device is under the power saving mode, are much lower than the power consumption of a single connection module, the total power consumption is greatly reduced.

What is claimed is:
1. A computing device, comprising:
 a connection module, comprising:
  a detection unit configured to detect whether the connection module is connected with an external peripheral device, so as to generate a detection signal; and
  a power switch configured to receive a power switching signal, so as to provide a rated voltage to the connection module according to the power switching signal;
 a processing unit and a logic expansion unit, wherein the processing unit and the logic expansion unit are coupled to each other, and when the computing device is at a normal mode, the processing unit provides the power switching signal, acquires a connection status between the connection module and the external peripheral device, and controls the logic expansion unit to record the connection status; and a switching unit coupled to the processing unit and the logic expansion unit and configured to switch the power switching signal provided by the processing unit and the logic expansion unit according to which mode, the normal mode or a power saving mode, the computing device is under;

wherein when the computing device is converted from the normal mode to the power saving mode, the logic expansion unit provides the power switching signal according to the connection status, such that the power switch stop providing electric power to the connection module which is not connected with the external peripheral device, and wherein the logic expansion unit continuously receives the electric power when the computing device is in the power saving mode.

2. The computing device according to claim 1, further comprising:

a microprocessor coupled to the processing unit and the logic expansion unit, the microprocessor is configured to receive the detection signal, and then to notify the processing unit and the logic expansion unit about the connection status between the connection module and the external peripheral device;

wherein when the computing device is in the power saving mode and the connection status between the connection module and the external peripheral device is converted from "connecting" to "disconnected", the microprocessor is configured to adjust the connection status of the logic expansion unit, such that the power switch stops providing electric power to the connection module which is not connected with the external peripheral device, and wherein the microprocessor continuously receives electric power when the computing device is in the power saving mode.

3. A computing device, comprising:

a plurality of connection modules, wherein each of the plurality of connection modules comprises:

a detection unit configured to detect whether the connection module is connected with an external peripheral device correspondingly, and to correspondingly generate a detection signal; and a power switch configured to receive a power switching signal and to provide a rated voltage to the connection module according to the power switching signal;

a processing unit and a logic expansion unit, wherein the processing unit and the logic expansion unit are coupled to each other, and when the computing device is in a normal mode, the processing unit is configured to provide the corresponding power switching signal, acquires a connection status between the connection modules and the plurality of corresponding external peripheral devices according to the corresponding detection signals, and to control the logic expansion unit to record the connection statuses; and a switching unit coupled to the processing unit and the logic expansion unit and configured to switch the power switching signals provided by the processing unit and the logic expansion unit according to which mode, the normal mode or a power saving mode, the computing device is under;

wherein when the computing device is converted from the normal mode to the power saving mode, the logic expansion unit is configured to provide the plurality of corresponding power switching signals according to the connection statuses, such that the plurality of corresponding power switches stop providing electric power to the plurality of connection modules which are not connected with the plurality of corresponding external peripheral devices, and wherein the logic expansion unit continuously receives electric power when the computing device is in the power saving mode.

4. The computing device according to claim 3, further comprising:

a microprocessor coupled to the processing unit and the logic expansion unit, the microprocessor is configured to receive the corresponding detection signals, and then notify the processing unit and the logic expansion unit about the connection statuses between the plurality of connection modules and the plurality of corresponding external peripheral devices;

wherein when the computing device is in the power saving mode and the connection statuses between the connection modules and the plurality of corresponding external peripheral devices are converted from "connecting" to "disconnected", the microprocessor is configured to adjust the connection statuses of the logic expansion unit, such that the corresponding power switches stop providing electric power to the connection modules which are not connected with the plurality of corresponding external peripheral devices, wherein the microprocessor continuously receives electric power when the computing device is in the power saving mode.

5. The computing device according to claim 4, wherein both the processing unit and the microprocessor communicate with and control the logic expansion unit through an inter-integrated circuit bus.

6. The computing device according to claim 3, wherein the logic expansion unit is a GPIO expander, the connection module is compliance with the standard of universal serial bus, and the power saving mode is a shutdown mode or a standby mode.

* * * * *